A. A. FAUCHER.
NUT LOCK.
APPLICATION FILED SEPT. 13, 1912.
1,058,294.
Patented Apr. 8, 1913.
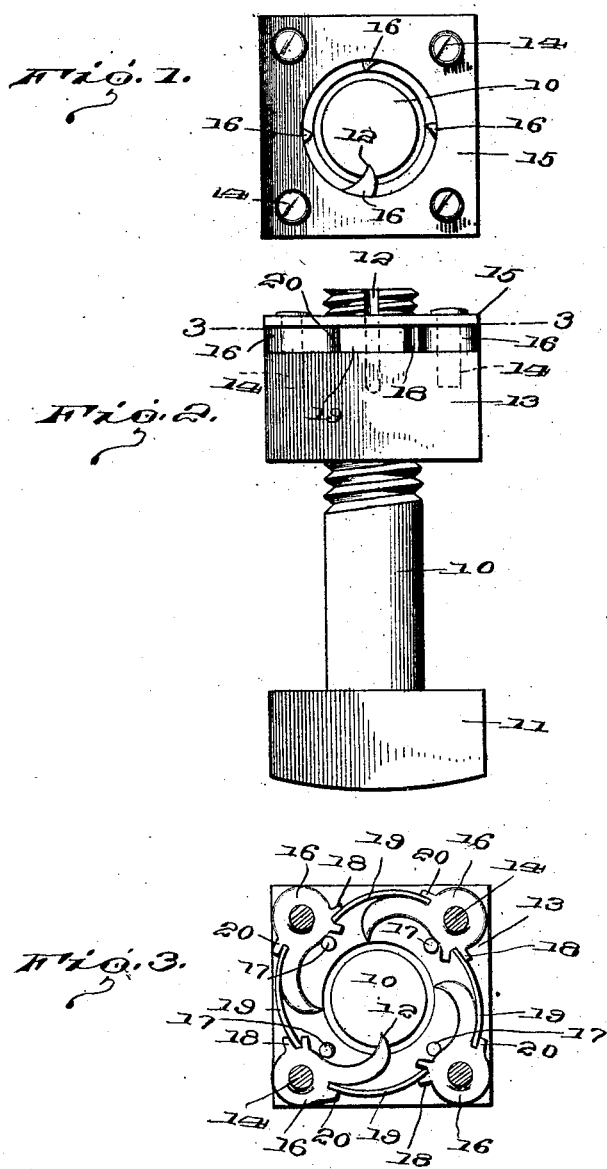
Inventor
A. A. Faucher

UNITED STATES PATENT OFFICE.

ARSAN ANTONY FAUCHER, OF MILAN, WISCONSIN.

NUT-LOCK.

1,058,294.

Specification of Letters Patent. Patented Apr. 8, 1913.

Application filed September 13, 1912. Serial No. 720,298.

*To all whom it may concern:*

Be it known that I, ARSAN A. FAUCHER, citizen of the United States, residing at Milan, in the county of Marathon and State of Wisconsin, have invented certain new and useful Improvements in Nut-Locks, of which the following is a specification.

This invention relates to improvements in nut locks for preventing the retrograde movement of nuts upon bolts, and has for its object to improve the construction and increase the efficiency and utility of devices of this character, and to provide a device whereby the nut may be readily released without destroying any of the parts when the nut is to be removed from the bolt.

With these and other objects in view, the invention consists in certain novel features of construction as hereinafter shown and described and then specifically pointed out in the claims, and in the drawings illustrative of the preferred embodiment of the invention, Figure 1 is a plan view of the improved device; Fig. 2 is a side elevation of the same; Fig. 3 is a plan view in section on the line 3—3 of Fig. 2.

Corresponding and like parts are referred to in the following description and indicated in all the views of the drawings by the same reference characters.

The improved device may be applied to bolts and nuts of various sizes and to bolts and nuts employed in connection with various structures, and it is not desired therefore, to limit the improved device to nuts or bolts employed for any specific purpose.

The stock of the bolt is represented conventionally at 10 and the head at 11 and provided with the usual threaded portion. Formed in one side of the bolt and transversely of the threads is a longitudinally extending groove or channel 12. Any required number of the channels may be employed, but generally one will be used as shown.

The nut is represented as a whole at 13 and is of the usual form and may be hexagonal or square as preferred, but for the purpose of illustration is shown applied to a square nut. Rising from the nut, preferably near each corner, is a stud 14 and engaging the various studs at their outer ends is a plate 15, the latter being spaced away from the body of the nut 13 as shown. The studs 14 form pivots to swingingly support a plurality of pawls 16, the points of the pawls being adapted to engage in the channel 12 one at a time as nut is rotated upon the bolt, and thus holding the nut from retrograde movement. By employing a plurality of the pawls, it will only be necessary to rotate the nut a portion of a revolution to enable it to be locked in position, which will be obvious. A stop pin 17 projects from the nut adjacent to the hub portion of each pawl and is disposed radially of the studs 14, each stud being thus associated with one of the stop pins as shown in Fig. 3. Each of the pawls is provided with a projection 18 at the side opposite to its bolt engaging point and each projection is provided with a seat to receive one end of a spring 19. Each of the pawls is also provided with a seat 20 to receive the opposite end of each of the springs 19. By this means each spring is seated at one of its ends in each of the pawls, and by grouping the pawls around a common center as shown in Fig. 3, the springs operate to maintain the pawls inwardly in their inward or operative position. By this simple means a plurality of pawls are employed and compactly arranged and coacting through the medium of the springs. The projections 18 extend slightly inward at their terminals so that the pawls are caused to coact with the pins 17 and thus limit their movement in one direction. By this arrangement it will be obvious that a very efficient nut lock is produced whereby the nut is free to be rotated in one direction upon the bolt, but will be effectually prevented from retrograde movement by the pawl which for the time being, is engaged with the channel 12 of the bolt.

The plate 15 is provided with a relatively large central opening through which the "points" of the pawls are exposed to enable a suitable implement to be inserted to simultaneously release the pawls and thus permit the nut to be removed. Any suitable implement may be employed for thus releasing the pawls, and it is not desired therefore, to limit the invention to any specific means to accomplish this result.

Having thus described my invention, what I claim is:

1. In a device of the class described, a bolt having a longitudinal groove transversely of its threads, a nut engaging said bolt, a plurality of pawls pivoted upon said nut and adapted to engage one at a time in the groove of the bolt, each of said pawls having spring receiving recesses at opposite sides of its pivot, and springs each engaging at its ends in the confronting sockets of each adjacent pair of pawls.

2. In a device of the class described, a bolt having a longitudinal groove transversely of its threads, a nut engaging said bolt, a plate, a plurality of studs connecting said plate to the nut and holding the same spaced from the outer face of the same, a pawl pivoted upon each of said studs and engaging in the groove of the bolt, each pawl having spring receiving sockets at opposite sides of said studs, and springs each engaging at its ends in the confronting sockets of each adjacent pair of the pawls.

3. In a device of the class described, a bolt having a longitudinal groove transversely of its threads, a nut engaging said bolt, a plate, a plurality of studs connecting said plate to the nut and holding the same spaced from the outer face of the same, a stop pin supported upon said nut between each of the plate supporting studs and the threaded apertures of the nut, a pawl pivoted upon each of said studs and engaging in the groove of the bolt, each pawl being limited in its movement in one direction by the stop pins and each pawl likewise having spring receiving sockets at opposite sides of said studs, and springs each engaging at its ends in the confronting sockets of each adjacent pair of the pawls.

4. In a device of the class described, a bolt having a longitudinal groove transversely of its threads, a nut engaging said bolt, a plate, a plurality of studs connecting said plate to the nut and holding the same spaced away from the outer face of the nut, a stop pin supported upon the nut between each of the plate supporting pins and the threaded aperture of the nut, a pawl pivoted upon each of said studs and engaging one at a time in the groove of the bolt, and springs operating to maintain the pawls in yieldable engagement with the groove of the bolt.

In testimony whereof I affix my signature in presence of two witnesses.

ARSAN ANTONY FAUCHER.

Witnesses:
EMIL F. E. SCHADE,
MARTIN ELLINGSON.